(12) United States Patent
Ashizawa et al.

(10) Patent No.: US 6,394,636 B1
(45) Date of Patent: May 28, 2002

(54) VEHICULAR HEADLAMP

(75) Inventors: Kazuhisa Ashizawa; Yu Shinomiya; Kazutami Oishi, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/521,683

(22) Filed: Mar. 9, 2000

(30) Foreign Application Priority Data

Mar. 10, 1999 (JP) ............................................ 11-063732

(51) Int. Cl.⁷ ................................................ F21M 3/16
(52) U.S. Cl. ........................ 362/517; 362/544; 362/546
(58) Field of Search ................................. 362/517, 544, 362/547, 294, 373, 543, 546, 507, 240

(56) References Cited

U.S. PATENT DOCUMENTS

| 4,862,337 A | * | 8/1989 | Ohshio et al. ............... 362/547 |
| 5,113,320 A | * | 5/1992 | Haydu ........................ 362/547 |
| 5,251,111 A | * | 10/1993 | Nagengast et al. ......... 362/547 |
| 5,678,916 A |  | 10/1997 | Watanabe et al. ........... 362/265 |
| 5,702,173 A |  | 12/1997 | Kawamura .................... 362/80 |
| 5,879,073 A |  | 3/1999 | Hori et al. .................... 362/344 |
| 5,895,113 A |  | 4/1999 | Ozaki et al. ................. 362/546 |
| 6,045,248 A | * | 4/2000 | Ashizawa .................... 362/547 |
| 6,168,303 B1 | * | 1/2001 | Ashizawa et al. ........... 362/547 |

FOREIGN PATENT DOCUMENTS

| DE | 196 54 190 A1 | 7/1997 | |
| DE | 196 32 909 A1 | 2/1998 | |
| EP | 0859188 A2 | 8/1998 | ............ F21M/7/00 |
| EP | 0859188 A3 | 9/1999 | ............ F21M/7/00 |
| GB | 2248293 A | 1/1992 | ............ F21M/7/00 |

* cited by examiner

Primary Examiner—Sandra O'Shea
Assistant Examiner—Peggy Neils
(74) Attorney, Agent, or Firm—Fish & Richardson P.C.

(57) ABSTRACT

A vehicular headlamp comprising a lighting compartment, first and second reflectors, a bulb, and a lighting circuit unit. The lighting compartment is defined by a lamp body and a front lens. The first and second reflectors are provided in the lighting compartment, and the second reflector is beside the first reflector. The bulb is mounted on the second reflector. The lighting circuit unit is provided below the first reflector and electrically connected to the bulb.

12 Claims, 5 Drawing Sheets

VEHICULAR HEADLAMP

BACKGROUND OF THE INVENTION

1. Field of the Invention

The present invention relates to a four-lamp vehicular headlamp system, more particularly to a vehicular headlamp having a discharge bulb mounted on a sub-beam reflector.

2. Description of the Related Art

Discharge bulbs can provide high-luminance illumination and are increasingly used as a light source for vehicular headlamps. Four-lamp vehicular headlamp systems can provide enhanced vision under illumination with sub-beams if the sub-beam reflectors are each fitted with a discharge bulb.

If a vehicular headlamp is fitted with a discharge bulb, a lighting circuit unit must be provided to light the discharge bulb by applying high voltage to it. In the conventional vehicular headlamp, the lighting circuit unit is provided below the reflector on which the discharge bulb is mounted. This means if the discharge bulb is mounted on a sub-beam reflector, the lighting circuit unit is provided below the sub-beam reflector.

FIG. 5 shows a half section of a conventional four-lamp vehicular headlamp system comprising a lighting compartment 106 formed of a lamp body 102 and a front lens 104, a main beam reflector 108M and a sub-beam reflector 108S placed side by side in the lighting compartment 106, and a discharge bulb 110 mounted on the sub-beam reflector 108S. If a lighting circuit unit 112 is provided below the sub-beam reflector 108S, the following problem occurs.

With the four-lamp headlamp system, the main beam or high beam is not lit when the illumination with the sub-beam or low beam is on and the space around the sub-beam reflector 108S in the lighting compartment 106 becomes hot by the heat generation from the discharge bulb 110 and the lighting circuit unit 112 while the space around the main beam reflector 108M remains cold. As a result, haze is most likely to occur on the inner surface of that portion of the front lens 104 which is in front of the main beam reflector 108M.

SUMMARY OF THE INVENTION

The present invention has been accomplished under these circumstances and has as an object providing a four-lamp vehicular headlamp system that has a discharge bulb mounted on each of the sub-beam reflectors and which yet is effectively protected against haze formation on the inner faces of the front lenses.

The present invention aims to attain the stated object by choosing a specific position for installing the lighting circuit unit.

That is, the present invention provides a vehicular headlamp comprising a lighting compartment formed of a lamp body and a front lens, a main beam reflector and a sub-beam reflector placed side by side in the lighting compartment, and a discharge bulb mounted on said sub-beam reflector, wherein a lighting circuit unit for lighting said discharge bulb is provided below said main beam reflector.

By the expression "provided below the main beam reflector" is meant that the position of the horizontal center of the lighting circuit unit does not coincide with the middle point between the optical axes of the main beam reflector and the sub-beam reflector but is offset toward the optical axis of the main beam reflector. As long as this condition is met and the lighting circuit unit is "below the main beam reflector", it may be provided either within or outside the lighting compartment.

As stated above, the vehicular headlamp of the present invention comprises a lighting compartment formed of a lamp body and a front lens, a main beam reflector and a sub-beam reflector placed side by side in the lighting compartment; although a discharge bulb is mounted on the sub-beam reflector, a lighting circuit unit for lighting the discharge bulb is provided below the main beam reflector, so under illumination with the sub-beam, the space around the sub-beam reflector in the lighting compartment becomes hot by the heat generation from the discharge bulb and the space around the main beam reflector also becomes hot by the heat generation from the lighting circuit unit. As a result, the temperature in the lighting compartment can be maintained generally uniform to ensure effective prevention of haze formation on the inner surface of the front lens.

The conventional vehicular headlamp has another problem peculiar to cold climates. During illumination with the sub-beam, snow deposited on that part of the front lens which is in front of the main beam reflector does not readily melt, so that when the sub-beam is turned off and the main beam comes on, the light reflected from the main beam reflector is not sufficiently projected ahead of the front lens that it becomes difficult to secure the intended luminous intensity distribution. In contrast, the design of the present invention permits the temperature in every part of the lighting compartment to rise during illumination with the sub-beam so that the entire surface of the front lens has a snow melting capability. As a result, when the sub-beam is switched to the main beam, the latter can provide an adequate luminous intensity distribution.

Preferably, the vehicular headlamp according to the present invention includes a passageway through which the heat generated from the lighting circuit unit is directed toward the front of the main beam reflector is formed in the lighting compartment. With this design, the efficiency with which that part of the front lens which is in front of the main beam reflector becomes hot during illumination with the sub-beam is sufficiently enhanced to produce a greater effect in preventing haze formation on the inner surface of the front lens and melting the snow deposited on that front lens.

The specific design of the "passageway" is not limited in any particular way. For example, if an extension reflector is provided in front of said both reflectors in said lighting compartment, the passageway can be provided by forming a cutout at the lower end of said extension reflector in front of the main beam reflector. By this design, the heat generated from the lighting circuit unit can be effectively directed to a site in front of the main beam reflector.

During illumination with the sub-beam, the corners at the lower end of the space around the main beam reflector in the lighting compartment tend to become colder than other areas to have a greater chance of haze formation. To deal with this problem, preferably, an air hole penetrating the lamp body is formed near its bottom at the end of the side where the main beam reflector is provided. With this design, atmospheric air is introduced into the lighting compartment via said air hole to provide an even greater anti-haze effect.

DETAILED DESCRIPTION OF THE PREFERRED EMBODIMENT

An embodiment of the invention is described below with reference to accompanying drawings.

Figure 1:
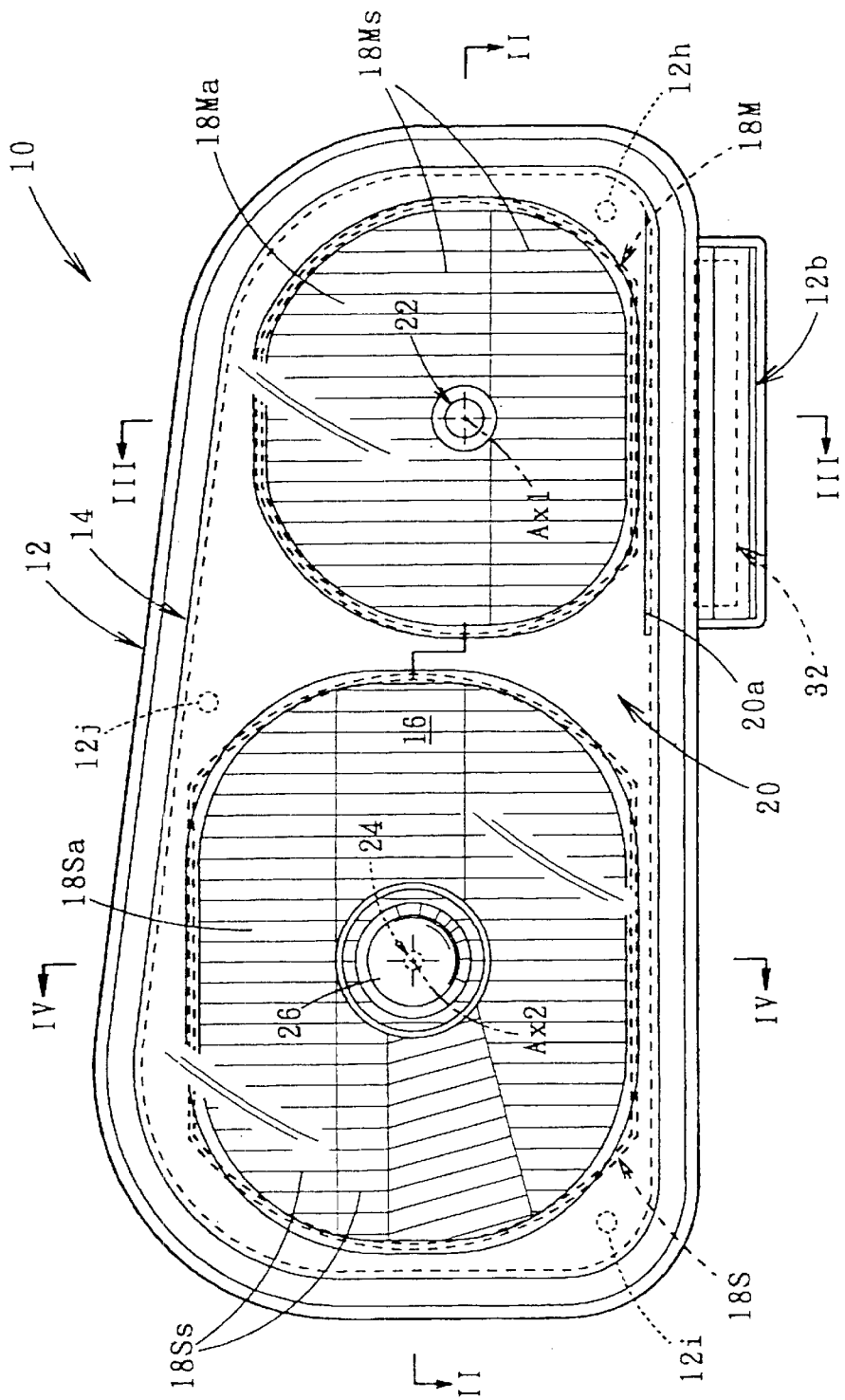
FIG. 1 is a front view of a vehicular headlamp according to an embodiment of the present invention.
Figure 2:
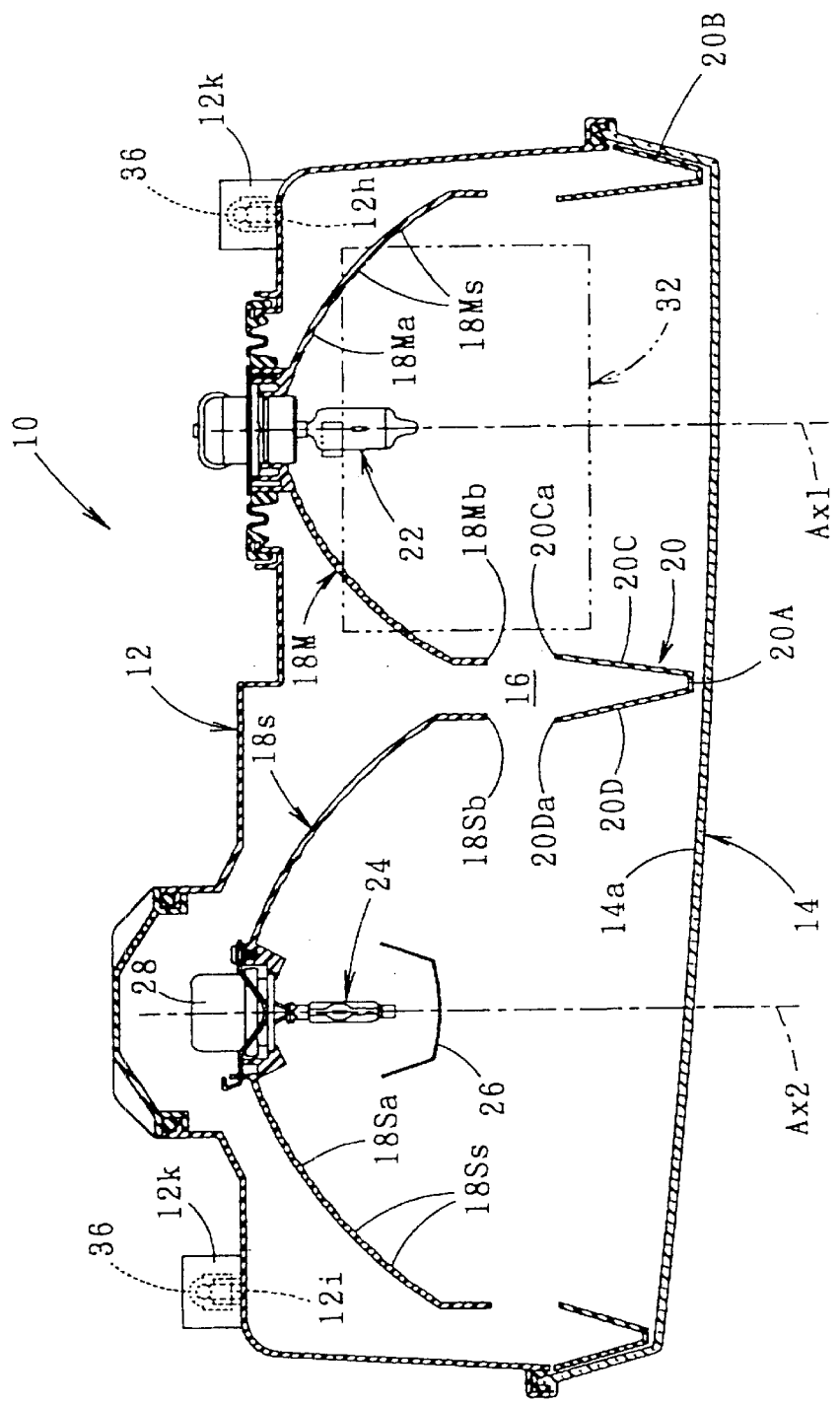
FIG. 2 is a section view taken along the line II—II of FIG. 1.
Figure 3:
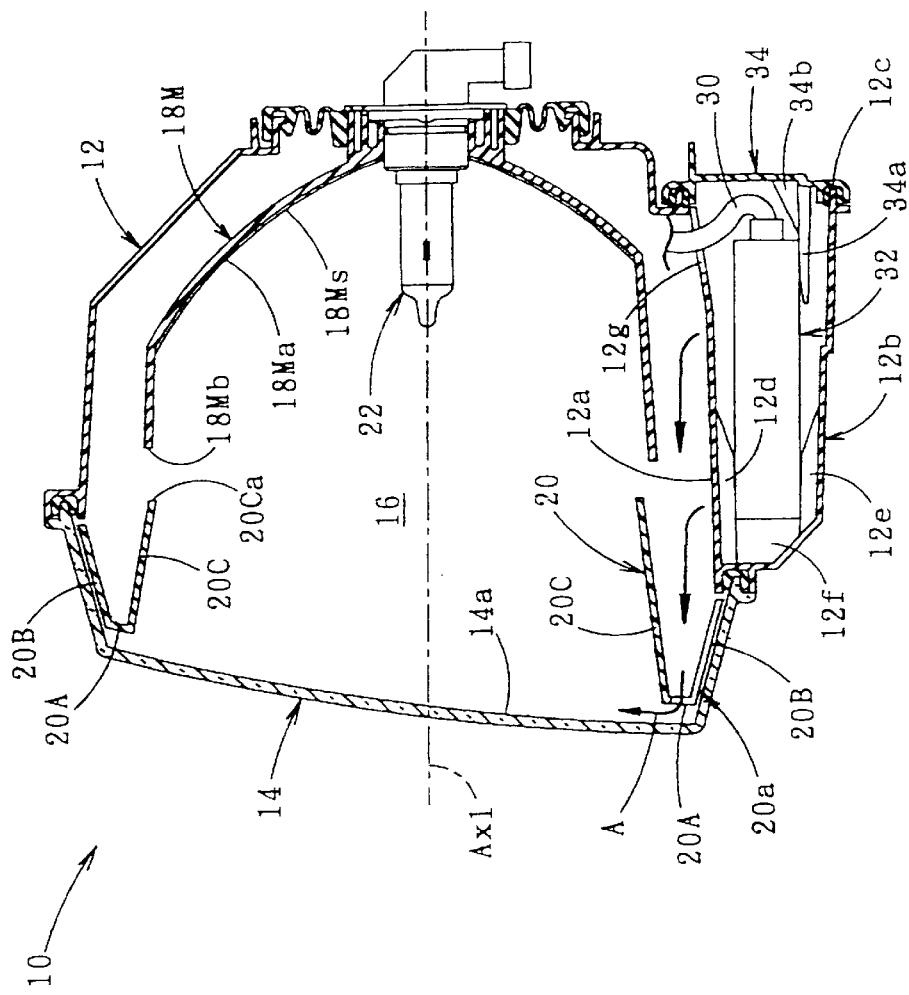
FIG. 3 is a section view taken along the line III—III of FIG. 1.
Figure 4:
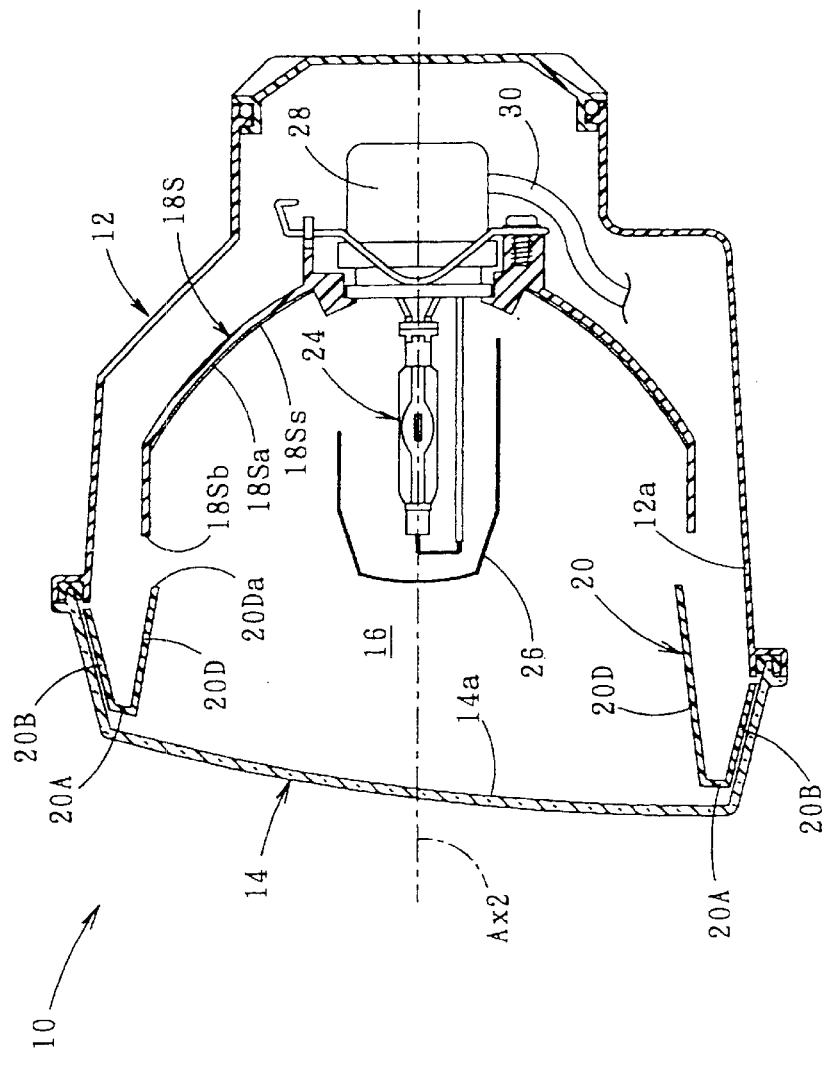
FIG. 4 is a section view taken along the line IV—IV of FIG. 1.
Figure 5:
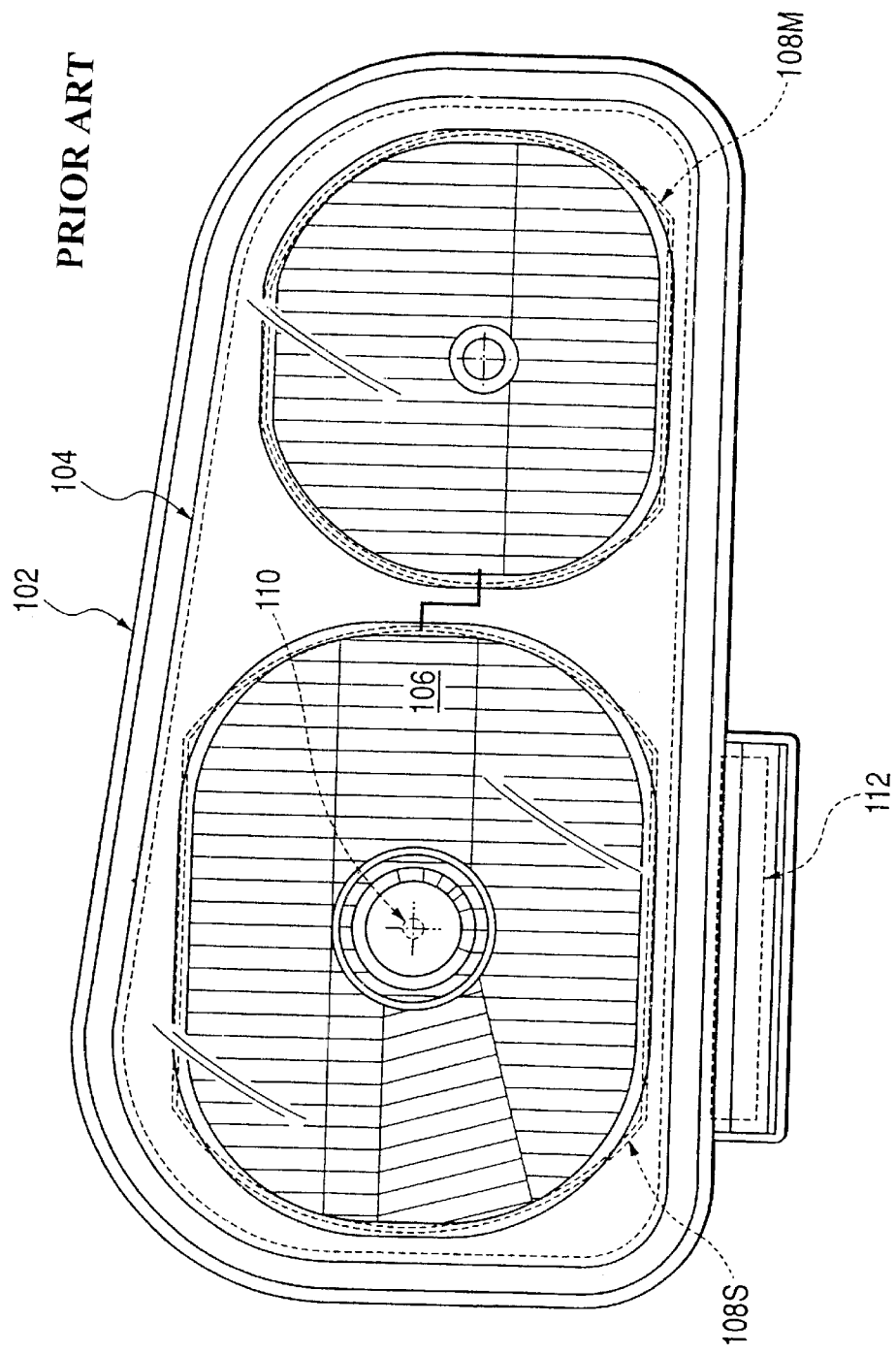
FIG. 5 is a front view of a conventional vehicular headlamp.

FIG. 1 is a front view of a vehicular headlamp according to an embodiment of the invention; FIGS. 2–4 are sections II—II, III—III and IV—IV, respectively, of FIG. 1.

As these figures show, the vehicular headlamp according to the embodiment which is generally indicated by 10 is a four-lamp headlamp system and comprises a lighting compartment 16 formed of a lamp body 12 and a front lens 14, and a main beam reflector 18M and a sub-beam reflector 18S are placed side by side in the lighting compartment 16. The two reflectors 18M and 18S are supported on the lamp body 12 in such a way that they can change directions either up and down or from right to left. An extension reflector 20 is provided in front of the reflectors 18M and 18S in the lighting compartment 16.

The front lens 14 is constituted by a transparent lens, and the luminous intensity distribution is controlled by the reflectors 18M and 18S.

Namely, the main beam reflector 18M has a reflective face 18Ma formed of a plurality of reflector elements 18Ms and a halogen bulb 22 is mounted on the optical axis Ax1. The light from the halogen bulb 22 is diffusely deflected and reflected by the reflective face 18Ma to generate illumination for the main beam.

For the same purpose, the sub-beam reflector 18S has a reflective face 18Sa formed of a plurality of reflector elements 18Ss and a discharge bulb (metal halide bulb) 24 is mounted on the optical axis Ax2, with a shade 26 being provided to cover the area in front of the discharge bulb 18. The light from the discharge bulb 24 is diffusely deflected and reflected by the reflective face 18Sa to generate illumination for the sub-beam.

The vehicular headlamp 10 according to the embodiment forms a luminous intensity distribution pattern for the sub-beam only by the sub-beam illumination generated by lighting of the discharge bulb 24 whereas a luminous intensity distribution pattern for the main beam is formed by the combination of the sub-beam illumination and the main beam illumination created by simultaneous lighting of the discharge bulb 24 and the halogen bulb 22.

The discharge bulb 22 needs high voltage to be lit and, hence, it is connected to a lighting circuit unit 32 via a bulb socket 28 and a high-voltage cord 30. The lighting circuit unit 32 comprises a starter circuit and a stabilizer circuit placed within a or outside which, in turn, is placed within a unit holder 12b formed under the bottom wall 12a of the lamp body 12 and below the main beam reflector 18M. The horizontal center of the lighting circuit unit 12b does not coincide with the optical axis Ax1 of the main beam reflector 18M but is slightly offset toward the optical axis Ax2 of the sub-beam reflector 18S.

An opening 12c is formed at the back of the unit holder 12b and fitted with a cover 34 to close it. The unit holder 12b and the cover 34 have ribs 12d, 12e, 12f, 34a and 34b for retaining the lighting circuit unit 32. A hole 12g through which to pass the high-voltage cord 30 is formed in the rear part of the bottom wall 12a of the lamp body 12.

The extension reflector 20 comprises a front panel portion 20A formed along the inner surface 14a of the front lens 14, a peripheral flange portion 20B formed along the periphery of the front panel portion 20A, and a pair of tubular portions 20C and 20D formed side by side in front of the reflectors 18M and 18S, respectively. The tubular portions 20C and 20D slightly taper toward the back and their rear end rims 20Ca and 20Da are formed in generally the same shape as the front end openings 18Mb and 18Sb of the reflectors 18M and 18S. The extension reflector 20 has a cutout 20a formed at its lower end in front of the main beam reflector 18M. The cutout 20a extends from the front panel portion 20A to the peripheral flange portion 20B.

The lamp body 12 has three air holes 12h, 12i and 12j that penetrate it from back to front; the holes 12h and 12i are formed near the bottom of the lamp body 12 at horizontal opposite ends whereas the hole 12j is formed near the top at its horizontal center. These air holes 12h, 12i and 12j are each fitted with a rubber tube 36 so that they are open downward. A guard rib 12k is formed over each of those air holes 12h, 12i and 12j in the lamp body 12.

As described above in detail, the vehicular headlamp of the invention 10 comprises the lighting compartment 16 formed of the lamp body 12 and the f front lens 14, the main beam ref lector 18M and the sub-beam ref lector 18S placed side by side in the lighting compartment 16; although the discharge bulb 24 is mounted on the sub-beam ref lector 18S, the lighting circuit unit 32 for lighting the discharge bulb 24 is provided below the main beam reflector 18M, so under illumination with the sub-beam, the space around the sub-beam reflector 18S in the lighting compartment 16 becomes hot by the heat generation from the discharge bulb 24 and the space around the main beam reflector 18M also becomes hot by the heat generation from the lighting circuit unit 32. As a result, the temperature in the lighting compartment 16 can be maintained generally uniform to ensure effective prevention of haze formation on the inner surface 14a of the front lens 14.

Particularly in the case of the present embodiment where the front lens 14 is constituted by a transparent lens, haze on its inner surface 14a will deteriorate the appearance of the lighting device even if the luminous intensity distribution that it produces is in no way affected. This problem can most effectively be prevented by adopting the design of the embodiment.

What is more, the design of the embodiment permits the temperature in every part of the lighting compartment 16 to rise during illumination with the sub-beam so that the entire surface of the front lens 14 has a snow melting capability. As a result, when the sub-beam is switched to the main beam, the latter can provide an adequate luminous intensity distribution even if the headlamp is used in cold climates.

The vehicular headlamp 10 according to the embodiment described above has the extension reflector 20 provided in front of the reflectors 18M and 18S in the lighting compartment 16. Since the extension reflector 20 has the cutout 20a formed at its lower end in front of the main beam reflector 18M, a passageway through which the heat generated from the lighting circuit unit 32 is directed toward the front of the main beam reflector 18M can be formed in the lighting compartment 16. With this design, the efficiency with which that part of the front lens 14 which is in front of the main beam reflector 18M becomes hot during illumination with the sub-beam is sufficiently enhanced to produce a greater effect in preventing haze formation on the inner surface 14a of the front lens 14 and melting the snow deposited on said front lens.

The vehicular headlamp 10 according to the embodiment described above also has the air hole 12h penetrating the lamp body 12 formed near its bottom at the end of the side where the main beam reflector 18M is provided. With this design, atmospheric air can be introduced into the lighting compartment 16 via the air hole 12h to provide an even greater anti-haze effect. During illumination with the sub-beam, the corners at the lower end of the space around the main beam reflector 18M in the lighting compartment 16 tend to become colder than other areas and have a greater chance of haze formation. This problem can most effectively be prevented by forming the air hole 12h. In the embodiment described above, the lamp body 12 also has the air hole 12j formed near the top at its horizontal center and convection can easily be created in the space around the main beam reflector 18M in the lighting compartment 16, providing an even greater anti-haze effect.

While only a certain embodiment of the invention has been specifically described herein, it will be apparent that numerous modifications may be made thereto without departing from the spirit and scope of the invention.

The present invention is based on Japanese Patent Application No. Hei. 11-63732 which is incorporated herein by reference.

What is claimed is:

1. A vehicle headlamp comprising:
   a lighting compartment defined by a lamp body and a front lens;
   a first reflector for a main beam provided in said lighting compartment;
   a second reflector for a sub-beam provided in said lighting compartment and beside said first reflector;
   a discharge bulb mounted on said second reflector; and
   a lighting circuit unit provided below said first reflector and electronically connected to said bulb.

2. The vehicular headlamp according to claim 1, wherein said lighting compartment includes a passageway conducting heat generated by said lighting circuit unit to a front portion of said first reflector.

3. The vehicular headlamp according to claim 1, wherein said lighting compartment includes an extension reflector provided in front of each of said first and second reflectors, said extension reflector including a cutout formed at a lower end portion in front of said first reflector.

4. The vehicular headlamp according to claim 2, wherein said lighting compartment includes an extension reflector provided in front of each of said first and second reflectors, said extension reflector including a cutout formed at a lower end portion in front of said first reflector.

5. The vehicular headlamp according to claim 1, wherein the lamp body includes a first air hole penetrating therethrough and provided adjacent to the bottom end of the side portion where said first reflector is provided to the lamp body.

6. The vehicular headlamp according to claim 5, wherein the lamp body further includes second and third air holes penetrating therethrough, and the second air holes is provided adjacent to the bottom end of the side portion where said second reflector is provided to the lamp body, and the third air holes is provided near the top portion of the horizontal center of the lamp body.

7. The vehicular headlamp according to claim 2, wherein the lamp body includes a first air hole penetrating therethrough and provided adjacent to the bottom end of the side portion where said first reflector is provided to the lamp body.

8. The vehicular headlamp according to claim 4, wherein the lamp body includes a first air hole penetrating therethrough and provided adjacent to the bottom end of the side portion where said first reflector is provided to the lamp body.

9. The vehicular headlamp according to claim 1, wherein the horizontal center of said lighting circuit unit is offset toward the optical axis of the first reflector from the middle point between the optical axes of said first and second reflector.

10. The vehicular headlamp according to claim 1, wherein said lighting circuit unit is provided inside said lighting compartment.

11. The vehicular headlamp according to claim 1, wherein said lighting circuit unit is provided outside said lighting compartment.

12. The vehicular headlamp according to claim 1, further comprising a unit holder formed under the bottom wall of the lamp body and encasing said lighting circuit unit therein.

* * * * *